Sept. 11, 1928.

O. K. KJOLSETH 1,684,282

RAILWAY TRUCK

Filed May 31, 1927

Inventor
Ole K. Kjolseth,
by
His Attorney.

Patented Sept. 11, 1928.

1,684,282

UNITED STATES PATENT OFFICE.

OLE K. KJOLSETH, OF SCOTIA, NEW YORK, ASSIGNOR TO GENERAL ELECTRIC COMPANY, A CORPORATION OF NEW YORK.

RAILWAY TRUCK.

Application filed May 31, 1927. Serial No. 195,249.

My invention relates to locomotive or car trucks and particularly to trucks for electrically propelled locomotives or cars.

An object of my invention is to improve and simplify the structure of these trucks by providing equalizers between the truck axles having a spring seat suspended therefrom for supporting the truck bolster.

A further object of my invention is to improve the arrangement for supporting the third-rail shoe on trucks which are intended for use on railway systems employing a third-rail to supply current to the locomotive or car.

My invention will be more fully set forth in the following description referring to the accompanying drawing, and the features of novelty which characterize my invention will be pointed out with particularity in the claims annexed to and forming part of this specification.

Figure 1:
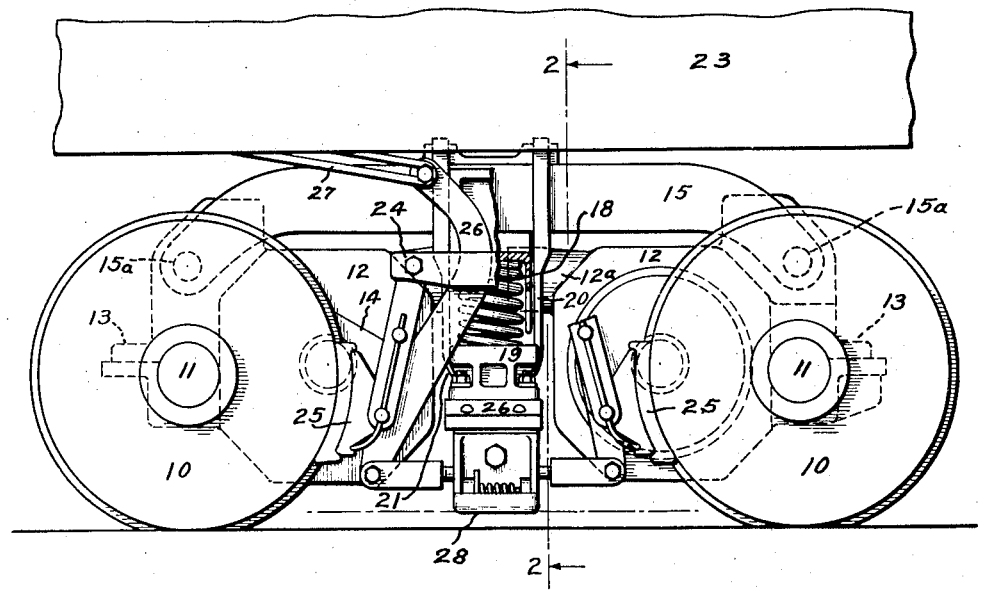
Figure 2:
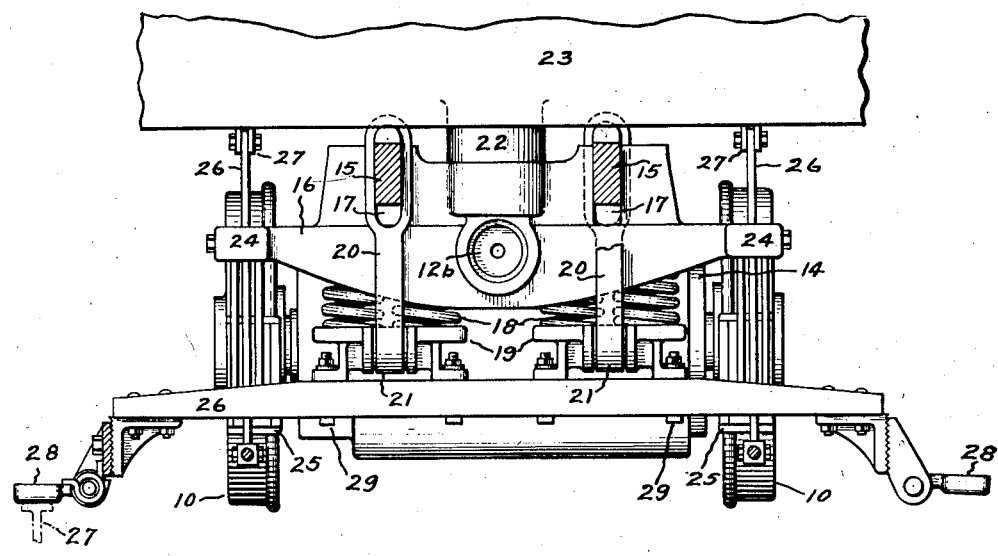
Figure 3:
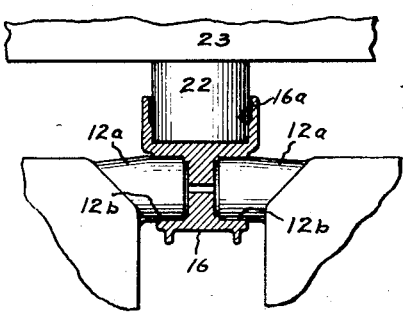

In the drawing Fig. 1 is a side elevation of a locomotive or car truck embodying my invention; Fig. 2 is a transverse section on the line 2—2 of Fig. 1; and Fig. 3 is a transverse section of the truck bolster showing the manner in which the truck motor frames are supported on the truck bolster.

Referring to the drawing, the form of my improved truck illustrated comprises wheels 10 mounted on spaced axles 11. Each axle is provided with a driving motor 12 which is supported at one end thereon by bearings 13 formed in the motor frame, the other end being supported on the truck bolster. These motors are geared to the shafts 11 by suitable gearing within a housing 14. The axles 11 are maintained in alignment by equalizers 15 which are arranged between the wheels of each axle and which are pivotally connected to the frames of the motors 12 at 15$^a$. The truck is provided with a bolster 16 having webs which are notched at 17 to engage the equalizers 15 for preventing lateral movement of the bolster relative to the truck. The bolster is supported from the equalizers 15 on coil springs 18 between the bolster and spring seats 19 which are suspended from the equalizers by the links 20 formed by the arms of the U-shaped members 21. The curved portions of the U-shaped members engage the spring seats 19 and the end of their arms 20 are formed in loops arranged over the equalizers 15. In such a construction the spring seats may shift from their position in vertical alignment with the bolster, which causes the springs to be tilted or cocked on their seats. This objection is overcome in my construction by arranging the arms 20 of the U-shaped members 21 closely adjacent the sides of the bolster so that movement of the spring seat longitudinally of the truck will be resisted by the arms 20 which are brought into contact with the bolster 16. The bolster is provided with recesses 12$^b$ into which extend noses 12$^a$ projecting from the motor frames, as shown in Fig. 3, so that the motors are partly supported on the bolster and maintained in alignment in the truck. As the motor frames have bearings on each axle and are held in alignment by the equalizers pivotally connected thereto, the motor noses 12$^a$ also guide the bolster as it moves up and down upon a deflection of the springs 18 under load or vibration of the truck. The bolster is also formed with a seat 16$^a$ adapted to receive a center pin 22 which is attached to the center plate of the locomotive or car 23. The usual brake rigging for the truck is supported from the ends of the bolster 16 at 24, in such a manner that the brake shoes 25 can be forced against the wheels by the action of the lever 26 which is connected to a brake operating mechanism by a link 27.

In order to adapt the truck for use on electric railway systems in which a third-rail is employed for supplying current to the locomotives or cars, a third-rail shoe beam 26 is supported on the truck transversely of the truck, substantially parallel to the axles, and extending at each end beyond the wheels adjacent the third-rail 27 for supporting the third-rail shoe 28 in contact therewith. The third-rail shoe beam is supported in this position by bolting it at 29 to the spring seats 19 which are suspended by the U-shaped members 21 from equalizers 15 of the truck.

In view of the foregoing it will be apparent that I have produced an improved spring supported construction in trucks of this character which also affords a simple and convenient means for supporting a third rail shoe beam for the truck.

Numerous modifications will occur to those skilled in the art of the precise embodiment of my invention shown and described, and I desire it to be understood, therefore, that my invention is not limited to this particular construction, and that I aim in the appended claims to cover all modifications which do not depart from the spirit and scope of my invention.

What I claim as new and desire to secure by Letters Patent of the United States, is:

1. A locomotive or car truck comprising wheels and axles, an equalizer supported by said axles, a bolster, a spring seat below said equalizer, means for supporting said spring seat on said equalizer, said supporting means engaging said bolster for maintaining said spring seat in alignment with said bolster, and a spring for supporting said bolster on said spring seat.

2. A locomotive or car truck comprising wheels and axles, an equalizer supported by said axles, a bolster, means carried by said bolster engaging said equalizer for guiding the former, a spring seat below said equalizer, means for supporting said spring seat on said equalizer and for maintaining said spring seat in alignment with said bolster, and a spring for supporting said bolster on said spring seat.

3. A locomotive or car truck comprising wheels and axles, an equalizer supported by said axles, a bolster having a guide thereon embracing said equalizer for preventing lateral movement of the former relative to the latter, a spring seat below said equalizer, links supporting said spring seat on said equalizer, said links extending adjacent each side of said bolster for maintaining said spring seat in alignment with said bolster, and a spring for supporting said bolster on said spring seat.

4. A locomotive or car truck comprising wheels and axles, an equalizer supported by said axles, a bolster having a notched extension embracing said equalizer for preventing lateral movement of the former relative to the latter, a spring seat below said equalizer, links supporting said spring seat on said equalizer, said links extending adjacent each side of said bolster for maintaining said spring seat in alignment with said bolster, said bolster extending under said equalizer and over said spring seat, and a spring for supporting said bolster on said spring seat.

5. A locomotive or car truck comprising wheels and two axles, two electric motors, each motor being geared to an axle, each motor having a frame provided with bearings for supporting the same on said axles, equalizers connecting said frames, a bolster, spring seats below said equalizers, means for supporting said spring seats on said equalizers adapted to engage said bolster for maintaining said spring seats in alignment with said bolster, and springs for supporting said bolster on said spring seats.

6. A locomotive or car truck comprising wheels and two axles, two electric motors, each motor being geared to an axle, each motor having a frame provided with bearings for said axles, an equalizer connecting said frames, a bolster having a guide thereon embracing said equalizer for preventing lateral movement of the former relative to the latter, a spring seat below said equalizer, links supporting said spring seat on said equalizer, said links extending adjacent each side of said bolster for maintaining said spring seat in alignment with said bolster, and a spring for supporting said bolster on said spring seat.

7. A locomotive or car truck comprising wheels and two axles, two electric motors, each motor being geared to an axle, each motor having a frame provided with bearings for supporting the same on said axles, an equalizer connecting said frames, a bolster having a notched extension embracing said equalizer for preventing lateral movement of the former relative to the latter, a spring seat below said equalizer, a link supporting said spring seat on said equalizer, said link extending adjacent each side of said bolster for maintaining said spring seat in alignment with said bolster, said bolster extending under said equalizer and over said spring seat, and a spring for supporting said bolster on said spring seat.

8. A locomotive or car truck comprising wheels and two axles, two electric motors, each motor being geared to an axle, each motor having a frame provided with bearings for supporting the same on said axles, equalizers connecting said frames, a bolster, means on said bolster for supporting said motor frames, spring seats below said equalizers, means for supporting said spring seats on said equalizers and engaging said bolster to maintain said spring seats in alignment with said bolster, and springs for supporting said bolster on said spring seats.

9. A locomotive or car truck comprising wheels and two axles, two electric motors, each motor being geared to an axle, each motor having a frame provided with bearings for supporting the same on said axles, equalizers connecting said frames, a bolster, means on said bolster for supporting said motor frames, said bolster having a notched extension engaging said equalizers for preventing lateral movement of the former relative to the latter, spring seats below said equalizers, links supporting said spring seats on said equalizers, said links extending adjacent each side of said bolster for maintaining said spring seats in alignment with said bolster, said bolster extending under said equalizers and over said spring seats, and springs for supporting said bolster on said spring seats.

10. An electric locomotive or car truck comprising wheels and axles, a truck frame comprising equalizers supported on said axles inside said wheels, a third-rail shoe beam below said equalizers, and means for supporting said beam on said equalizers.

11. An electric locomotive or car truck comprising wheels and axles, a truck frame comprising equalizers supported on said axles, spring seats below said equalizers for supporting a bolster, means for supporting said spring seats on said equalizers, a third-rail shoe, and means for supporting said third-rail shoe on one of said spring seats.

12. An electric locomotive or car truck comprising wheels and axles, a truck frame comprising equalizers supported on said axles, spring seats below said equalizers for supporting a bolster, means for supporting said spring seats on said equalizers, a third-rail shoe beam, and means for supporting said beam on said spring seats transversely of said truck.

In witness whereof I have hereunto set my hand this 28th day of May, 1927.

OLE K. KJOLSETH.